United States Patent
Bramnik et al.

(10) Patent No.: US 9,156,693 B2
(45) Date of Patent: *Oct. 13, 2015

(54) SYNTHESIS OF LITHIUM-METAL-PHOSPHATES UNDER HYDROTHERMAL CONDITIONS

(75) Inventors: Kirill Bramnik, Dossenheim (DE); Hartmut Hibst, Schriesheim (DE); Jordan Keith Lampert, Ludwigshafen (DE); Simon Schroedle, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 983 days.

This patent is subject to a terminal disclaimer.

(21) Appl. No.: 13/142,606

(22) PCT Filed: Dec. 22, 2009

(86) PCT No.: PCT/EP2009/067742
§ 371 (c)(1), (2), (4) Date: Jun. 29, 2011

(87) PCT Pub. No.: WO2010/076265
PCT Pub. Date: Jul. 8, 2010

(65) Prior Publication Data
US 2011/0272639 A1 Nov. 10, 2011

Related U.S. Application Data

(60) Provisional application No. 61/141,117, filed on Dec. 29, 2008.

(51) Int. Cl.
H01M 4/88 (2006.01)
H01B 1/06 (2006.01)
H01B 1/12 (2006.01)
C01B 25/45 (2006.01)
H01M 4/58 (2010.01)
H01M 4/62 (2006.01)
H01M 10/0525 (2010.01)

(52) U.S. Cl.
CPC ............ C01B 25/45 (2013.01); H01M 4/5825 (2013.01); H01M 4/625 (2013.01); H01M 10/0525 (2013.01)

(58) Field of Classification Search
None
See application file for complete search history.

(56) References Cited

U.S. PATENT DOCUMENTS

| 6,203,946 | B1 | 3/2001 | Barker et al. | |
|---|---|---|---|---|
| 6,702,961 | B2 | 3/2004 | Barker et al. | |
| 2003/0082454 | A1 | 5/2003 | Armand et al. | |
| 2008/0241043 | A1* | 10/2008 | Barker et al. | 423/301 |
| 2009/0117022 | A1 | 5/2009 | Nuspl et al. | |
| 2009/0233096 | A1 | 9/2009 | Schall et al. | |
| 2012/0012797 | A1 | 1/2012 | Bramnik et al. | |
| 2014/0147586 | A1* | 5/2014 | Liang et al. | 427/215 |

FOREIGN PATENT DOCUMENTS

| CN | 1 547 273 | 11/2004 |
|---|---|---|
| DE | 10 2005 012 640 | 9/2006 |
| DE | 10 2005 015 613 | 10/2006 |
| JP | 2006-511038 A | 3/2006 |
| JP | 2006-516172 A | 6/2006 |
| JP | 2008-293661 A | 12/2008 |
| WO | WO 03/038930 A2 | 5/2003 |
| WO | 2006 057146 | 6/2006 |
| WO | 2007 049815 | 5/2007 |
| WO | 2007 093856 | 8/2007 |
| WO | 2009 127674 | 10/2009 |

OTHER PUBLICATIONS

International Search Report issued Nov. 5, 2010 in PCT/EP09/67742 filed Dec. 22, 2009.

* cited by examiner

Primary Examiner — Harold Pyon
Assistant Examiner — Jaison Thomas
(74) Attorney, Agent, or Firm — Oblon, McClelland, Maier & Neustadt, L.L.P.

(57) ABSTRACT

The present invention relates to a process for the preparation of compounds of general formula (I) $Li_{a-b}M^1_b Q_{1-c}M^2_c P_{d-e} M^3_e O_x$ (1), wherein Q has the oxidation state +2 and $M^1$, $M^2$, $M^3$, a, b, c, d, e and x are: Q: Fe, Mn, Co, Ni, $M^1$: Na, K, Rb and/or Cs, $M^2$: Mg, Al, Ca, Ti, Co, Ni, Cr, V, Fe, Mn, wherein Q and M2 are different from each other, $M^3$: Si, S, F a: 0.8-1.9, b: 0-0.3, c: 0-0.9, d: 0.8-1.9, e: 0-0.5, x: 1.0-8, depending on the amount and oxidation state of Li, $M^1$, $M^2$, P, $M^3$, wherein compounds of general formula (I) are neutrally charged, comprising the following steps (A) providing a mixture comprising at least one lithium-comprising compound, at least one Q-comprising compound, in which Q has at least partially an oxidation state higher than +2, and at least one $M^1$-comprising compound, if present, and/or at least one $M^2$-comprising compound, if present, and/or least one $M^3$-comprising compound, if present, and at least one reducing agent which is oxidized to at least one compound comprising at least one phosphorous atom in oxidation state +5, and (B) heating the mixture obtained in step (A) at a temperature of 100 to 500° C. and at an autogeneous pressure to reduce Q to oxidation state +2 and to obtain a compound of general formula (I).

11 Claims, No Drawings

SYNTHESIS OF LITHIUM-METAL-PHOSPHATES UNDER HYDROTHERMAL CONDITIONS

The present invention relates to a process for the preparation of compounds comprising lithium, at least one further metal and phosphate-anions, to a process for the preparation of mixtures comprising these compounds and at least one electrically conducting material, to the compounds and the mixtures, preparable by these processes and the use of these compounds and mixtures for the preparation of cathodes of lithium ion batteries.

Processes for the preparation of $LiFePO_4$ are already known from the prior art.

US 2003/0082454 A1 discloses a method for preparing $LiFePO_4$ by mixing $Li_2CO_3$ or $LiOH\ H_2O$, $Fe(CH_3CO_2)_2$ and $NH_4H_2PO_4\ H_2O$. The solid mixture is calcinated at 300 to 350° C., in order to eliminate $NH_3$, $H_2O$ and $CO_2$. The mixture is subsequently further processed under argon for 24 hours at 800° C. This document further mentions the method of preparing $LiFePO_4$ based material by calcination of a milled mixture comprising $Li_2C_2O_4$, $LiH_2PO_4$ and $Fe(C_2O_4)\cdot 2\ H_2O$.

U.S. Pat. No. 6,702,961 B2 also discloses a method for the preparation of $LiFePO_4$ by pelletising a milled mixture consisting of $FePO_4$, $Li_2CO_3$ and carbon, followed by calcination at 700° C. for 8 hours in an inert atmosphere.

The abstract of CN 1547273 A discloses a method for the preparation of $LiFePO_4$ by calcination of a milled and subsequently tablettized mixture of $Li_2CO_3$, $FeC_2O_4\cdot 2\ H_2O$ and $(NH_4)_2HPO_4$ with the addition of carbon under microwave radiation.

DE 10 2005 015613 A1 and DE 10 2005 012 640 A1 disclose that $LiFePO_4$ can be obtained by hydrothermal treatment of an aqueous mixture comprising $Fe(II)SO_4\cdot 7\ H_2O$, $H_3PO_4$ and $LiOH\ H_2O$ under nitrogen at 160° C. for 10 hours. During said hydrothermal treatment the desired $LiFePO_4$ precipitates from the aqueous mixture. No component of the reaction mixture is reduced or oxidized.

WO 2006/057146 A2 discloses that $LiFePO_4$ can be obtained by melting a mixture comprising $Fe(II)O$, $P_2O_5$ and LiOH at 1100° C. under argon, followed by milling.

WO 2007/093856 A1 relates to a process for the preparation of $LiMnPO_4$ by mixing corresponding precursor compounds like Mn(II)-compounds, Li-compounds and $PO_4$-comprising compounds in water, followed by precipitation reaction to obtain the desired compound without any reduction step. WO 2007/113624 A1 discloses a very similar process in which mixing and precipitating of the precursor compounds is conducted in polyol solvents.

In WO 2007/049815 A2 it is disclosed that $LiMnPO_4$ can be obtained by reducing $Mn(OH)_x$ compounds to $Mn(OH)_2$, followed by mixing of the obtained $Mn(OH)_2$ with Li- and $PO_4$-containing compounds to obtain $LiMnPO_4$ by precipitation. A process for the preparation of $LiMnPO_4$ by reduction of Mn-comprising compounds in the presence of other precursor is not disclosed in this prior art.

The processes for the preparation of $LiFePO_4$ according to the prior art bear the drawback that an additional reducing agent like carbon has to be added to the reaction mixture or that the calcination step has to be conducted in a reducing atmosphere. Because the added carbon acts as a reducing agent only at high reaction temperatures, high calcination temperatures are necessary which lead to a material with large crystal grains and with a broad particle size distribution.

Other disadvantages are that if solid compounds like $Li_2CO_3$ and $Fe_2O_3$ are mixed in solid phase, it is difficult to obtain a mixture having a homogenous dispersion of the different ions throughout the whole mixture. In addition, carbon containing reducing agents show the disadvantage that their reducing power is not independent from the amount in which they are used, and therefore it is not easy to foresee which amount of carbon containing reducing agent is needed for the reduction and which amount can be used as electrically conducting material.

The object of the present invention is to provide a process for the preparation of lithium-metal-phosphates which makes it possible to obtain these compounds in a very homogenously mixed and crystalline state. In addition, it is an object of the present invention to provide a process for the preparation of the mentioned compounds which can be conducted easily and in only two reaction steps. Moreover, it is a preferred object of the present invention to provide a process for the preparation of lithium-metal-phosphates, in which no calcination step is necessary at all. It is another object to provide a process in which only the desired compound is obtained without any disturbing side products making any purification and/or washing steps unnecessary. It is a further object to obtain a more finely dispersed material with a very narrow size distribution of the crystallites, supplying improved Li-ion diffusivity in the charging and discharging of a Li-ion battery, in order to improve the Li-ion diffusivity and therewith the power characteristics and additionally to increase the capacity of a Li-ion battery.

These objects are achieved by a process for the preparation of compounds of general formula (I)

$$Li_{a-b}M^1{}_b Q_{1-c}M^2{}_c P_{d-e}M^3{}_e O_x \qquad (I),$$

wherein Q has the oxidation state +2 and $M^1$, $M^2$, $M^3$, a, b, c, d, e and x are:

Q: Fe, Mn, Co, Ni
$M^1$: Na, K, Rb and/or Cs,
$M^2$: Mg, Al, Ca, Ti, Co, Ni, Cr, V, Fe, Mn, wherein Q and $M^2$ are different from each other,
$M^3$: Si, S, F
a: 0.8-1.9,
b: 0-0.3,
c: 0-0.9,
d: 0.8-1.9,
e: 0-0.5,
x: 1.0-8, depending on the amount and oxidation state of Li, $M^1$, $M^2$, P, $M^3$, wherein compounds of general formula (I) are neutrally charged,
comprising the following steps (A) providing a mixture comprising at least one lithium-comprising compound, at least one Q-comprising compound, in which Q has at least partially an oxidation state higher than +2, and at least one $M^1$-comprising compound, if present, and/or at least one $M^2$-comprising compound, if present, and/or least one $M^3$-comprising compound, if present, and at least one reducing agent which is oxidized to at least one compound comprising at least one phosphorous atom in oxidation state +5, and (B) heating the mixture obtained in step (A) at a temperature of 100 to 500° C. and at an autogeneous pressure to reduce Q to oxidation state +2 and to obtain a compound of general formula (I).

In a preferred embodiment, $M^1$, $M^2$, $M^3$, a, b, c, d, e and x have the following meanings:
Q: Fe, Mn, Co, Ni,
$M^1$: Na,
$M^2$: Mn, Mg, Al, Ca, Ti, Co, Ni, wherein Q and $M^2$ are different from each other,
$M^3$: Si, S, F, a: 0.6-1.6, particularly preferred 0.9-1.3,
b: 0-0.1,
c: 0-0.6, particularly preferred 0-0.3
d: 0.6-1.6, particularly preferred 0.9-1.3
e: 0-0.3, particularly preferred 0-0.1
x: 2-6, depending on the amount and oxidation state of Li, $M^1$, $M^2$, P, $M^3$,
wherein compounds according to general formula (I) are neutrally charged.

For example, in a very preferred embodiment, $M^1$, $M^2$ and $M^3$ are absent and Q is Fe, in order to have a neutrally charged compound of general formula (I) LiFePO$_4$, in which Fe is in oxidation state +2. Therefore, in a first very preferred embodiment, the process according to the present invention is conducted in order to obtain the compound of formula LiFePO$_4$.

In an other very preferred embodiment, $M^1$, $M^2$ and $M^3$ are absent and Q is Mn, in order to have a neutrally charged compound of general formula (I) LiMnPO$_4$, in which Mn is in oxidation state +2. Therefore, in a second very preferred embodiment, the process according to the present invention is conducted in order to obtain the compound of formula LiMnPO$_4$.

In further preferred embodiments, $M^1$, being for example Na, is present in an amount of up to 10 mol %, in respect of the sum of Li and $M^1$. In another preferred embodiment, $M^2$ is present in an amount of up to 30 mol %, in respect of the sum of Q, being preferably Fe or Mn, and $M^2$ present in the compound. In another preferred embodiment, $M^3$, being for example Si, is present in an amount of up to 10 mol %, in respect of the sum of phosphorous and $M^3$.

Process steps (A) and (B) are explained in the following in more detail:

Step (A):

Step (A) of the process according to the present invention comprises providing a mixture comprising at least one lithium-comprising compound, at least one Q-comprising compound, being for example the Fe- or Mn-comprising compound, in which Q has at least partially an oxidation state higher than +2, and at least one $M^1$-comprising compound, if present, and/or at least one $M^2$-comprising compound, if present, and/or least one $M^3$-comprising compound, if present, and at least one reducing agent which is oxidized to at least one compound comprising at least one phosphorous atom in oxidation state +5.

In general, all Li—, $M^1$-, $M^2$-, $M^3$- and Q-comprising compounds, being preferably Fe— or Mn-comprising compounds, known to a person having ordinary skill in the art which are able to be incorporated in an essentially aqueous mixture in step (A) of the process can be used in the process according to the present invention.

The Li-comprising compound in step (A) is preferably chosen from the group consisting of lithium hydroxide LiOH, lithium hydroxide-hydrate LiOH.H$_2$O, lithium acetate LiOAc, lithium carbonate Li$_2$CO$_3$, lithium-phosphates. -phosphites, -hypophosphites, like LiH$_2$PO$_4$, Li$_2$HPO$_4$, Li$_3$PO$_4$, LiH$_2$PO$_3$, Li$_2$HPO$_3$, and/or LiH$_2$PO$_2$, and mixtures thereof. In a very preferred embodiment, lithium hydroxide LiOH and/or lithium hydroxide-hydrate LiOH.H$_2$O and/or lithium carbonate Li$_2$CO$_3$ are used as lithium-comprising compounds in step (A) of the process according to the present invention. Two particularly preferred lithium-comprising compounds are lithium hydroxide LiOH and lithium hydroxide-hydrate LiOH.H$_2$O.

The at least one lithium-comprising compound is added to the mixture in step (A) in the process according to the present invention in a concentration of in general 0.04 to 3 mol Li/L, preferably 0.2 to 2.0 mol Li/L, particularly preferred 0.3 to 1.5 mol Li/L, based on the whole reaction mixture in each case.

In a first preferred embodiment Q is Fe, in order to obtain a compound of general formula (Ia)

$$Li_{a-b}M^1{}_bFe_{1-c}M^2{}_cP_{d-e}M^3{}_eO_x \qquad (I),$$

wherein Fe has the oxidation state +2 and $M^1$, $M^2$, $M^3$, a, b, c, d, e and x have the meanings as mentioned above. In this embodiment, in step (A) of the process according to the present invention, the Q-comprising compound has to be an iron-comprising compound in which iron has the oxidation state +3.

In general, all iron-comprising compounds in which iron has the oxidation state +3, known to a person having ordinary skill in the art can be used in the process according to the present invention, which are able to be incorporated in a preferably essentially aqueous mixture in step (A) of the process. According to the present invention, a single iron-comprising compound in which iron has the oxidation state +3, or a mixture of different iron-comprising compounds in which iron has the oxidation state +3 can be used. It is also possible that an iron-comprising compound is used in which both, iron in oxidation state +2 and +3 is present, like for example Fe$_3$O$_4$. It is also possible that a mixture of different iron-comprising compounds is used comprising one compound in which iron has the oxidation state +3 and another compound in which iron has the oxidation state +2.

In a preferred embodiment, the iron-comprising compound in which iron has the oxidation state +3 is chosen from the group consisting of iron (II,III)-oxide, iron(III)-oxide, iron (III)-oxide hydroxide, or iron(III)-hydroxide, for example Fe$_3$O$_4$, alpha-Fe$_2$O$_3$, gamma-Fe$_2$O$_3$, alpha-FeOOH, beta-FeOOH, gamma-FeOOH and Fe(OH)$_3$. Preferred are the alpha-, beta- and gamma-modification of iron(III)-oxide hydroxide (FeOOH) and Fe(OH)$_3$.

The iron-comprising compound has in general a BET surface, measured according to methods known to a person having ordinary skill in the art, of at least 5 m$^2$/g, preferably at least 50 m$^2$/g, more preferably at least 150 m$^2$/g. The BET surface is in general not larger than 1000 m$^2$/g. If iron-comprising compounds are used having a very high BET surface, the reaction time of the process can be decreased, giving rise to a process according to the present invention, which is faster and more economic than the processes of the prior art.

The at least one iron-comprising compound is added to the mixture in step (A) in the process according to the present invention in a concentration of in general 0.04 to 4.0 mol Fe/L, preferably 0.1 to 2.0 mol Fe/L, particularly preferred 0.2 to 1.5 mol Fe/L, based on the whole reaction mixture in each case.

In a second preferred embodiment Q is Mn, in order to obtain a compound of general formula (Ia)

$$Li_{a-b}M^1{}_bMn_{1-c}M^2{}_cP_{d-e}M^3{}_eO_x \qquad (I),$$

wherein Mn has the oxidation state +2 and $M^1$, $M^2$, $M^3$, a, b, c, d, e and x have the meanings as mentioned above. In this embodiment, in step (A) of the process according to the present invention, the Q-comprising compound has to be a manganese-comprising compound in which manganese has an oxidation state being at least partially higher than +2.

In general, all manganese-comprising compounds in which manganese has an oxidation state being at least partially higher than +2, and which can be reduced to Mn(II) known to a person having ordinary skill in the art can be used in the process according to the present invention, which are able to be incorporated in a preferably essentially aqueous mixture in step (A) of the process.

In the manganese-comprising compounds, manganese can be present in all possible oxidation states, for example +2, +3, +4, +5, +6 and +7, wherein at least some of the manganese shall be present in an oxidation state being higher than +2. According to the present invention, a single manganese-comprising compound in which manganese has the oxidation state +2, +3, +4, +5, +6, and/or +7, preferably +2 and +3 or +4, or a mixture of different manganese-comprising compounds in which manganese has the oxidation state +2, +3, +4, +5, +6, and/or +7, preferably +2 and +3 or +4, can be used.

Preferably, a manganese-comprising compound is used in which manganese in oxidation state +2 and +3 is present, like for example $Mn_3O_4$. In another preferred embodiment, a manganese comprising compound is used in which manganese has the oxidation state +4, like $MnO_2$, or +3 like $Mn_2O_3$. It is also possible that a mixture of different manganese-comprising compounds is used comprising one compound in which manganese has the oxidation state +2 and +3, like $Mn_3O_4$, and another compound in which manganese has the oxidation state +4, like $MnO_2$.

In a preferred embodiment, the manganese-comprising compound is chosen from the group consisting of manganese (II,III)-oxide $Mn_3O_4$, manganese(IV)oxide $MnO_2$, $Mn_2O_3$ and mixtures thereof.

The manganese-comprising compound has in general a BET surface, measured according to methods known to a person having ordinary skill in the art, of at least 2 $m^2/g$, preferably at least 5 $m^2/g$, more preferably at least 10 $m^2/g$. The BET surface is in general not larger than 1000 $m^2/g$. If manganese-comprising compounds are used having a very high BET surface, the reaction time of the process can be decreased, giving rise to a process according to the present invention, which is faster and more economic than the processes of the prior art.

The at least one manganese-comprising compound is added to the mixture in step (A) in the process according to the present invention in a concentration of in general 0.04 to 4.0 mol Mn/L, preferably 0.1 to 2.0 mol Mn/L, particularly preferred 0.2 to 1.5 mol Mn/L, based on the whole reaction mixture in each case.

In general, the Q-comprising compound has in general a BET surface, measured according to methods known to a person having ordinary skill in the art, of at least 2 $m^2/g$, preferably at least 5 $m^2/g$, more preferably at least 10 $m^2/g$. The BET surface is in general not larger than 1000 $m^2/g$. If Q-comprising compounds are used having a very high BET surface, the reaction time of the process can be decreased, giving rise to a process according to the present invention, which is faster and more economic than the processes of the prior art.

In general, the at least one Q-comprising compound is added to the mixture in step (A) in the process according to the present invention in a concentration of in general 0.04 to 4.0 mol Q/L, preferably 0.1 to 2.0 mol Q/L, particularly preferred 0.2 to 1.5 mol Q/L, based on the whole reaction mixture in each case.

All cobalt-comprising compounds in which cobalt has an oxidation state being at least partially higher than +2, and which can be reduced to Co(II) known to a person having ordinary skill in the art can be used in the process according to the present invention, which are able to be incorporated in a preferably essentially aqueous mixture in step (A) of the process. Preferred Co-comprising compounds are CoO(OH) and $Co_3O_4$.

In addition, all nickel-comprising compounds in which nickel has an oxidation state being at least partially higher than +2, and which can be reduced to Ni(II) known to a person having ordinary skill in the art can be used in the process according to the present invention, which are able to be incorporated in a preferably essentially aqueous mixture in step (A) of the process. A preferred Ni-comprising compound is NiO(OH).

The at least one $M^1$-comprising compound, if present, is preferably chosen from the group consisting of sodium hydroxide NaOH, sodium acetate NaOAc, sodium carbonate $Na_2CO_3$, and mixtures thereof. In a very preferred embodiment, sodium hydroxide NaOH and/or sodium carbonate $Na_2CO_3$ are used as sodium-comprising compounds in step (A) of the process according to the present invention.

The at least one $M^2$-comprising compound, if present, is preferably chosen from compounds having the required cation and an anion chosen from hydroxide, acetate, oxide, carbonate, halogenide, like fluoride, chloride, bromide, iodide, nitrate, and mixtures thereof. In a very preferred embodiment, the anion of the at least one $M^2$-comprising compound is acetate, oxide, hydroxide, carbonate, nitrate, or mixtures thereof.

The at least one $M^3$-comprising compound, if present, is preferably chosen from $H_2SO_4$, $(NH_4)HSO_4$, $(NH_4)_2SO_4$, $LiHSO_4$, $Li_2SO_4$, finely divided $SiO_2$, e.g. in form of a sol, $H_4SiO_4$, Li-silicate, $NH_4F$, LiF, HF, polycarbon monofluoride, polycarbon fluoride, poly(carbon monofluoride), graphite fluoride, $Li_2SiF_6$, $(NH_4)_2SiF_6$ and mixtures thereof.

$M^1$-, $M^2$-, and/or $M^3$-comprising compounds are added to the preferably essentially aqueous mixture, if present, in amounts, in which they are present in compounds of formula (I). A person having ordinary skill in the art knows how to calculate the required amount.

The process according to the present invention is conducted by introducing at least one reducing agent into the mixture in step (A) of the process according to the present invention, which is oxidized to at least one compound comprising at least one phosphorous atom in an oxidation state +5 during the process according to the present invention. The use of at least one reducing agent, which is oxidized to at least one compound comprising at least one phosphorous atom in oxidation state +5 has the advantage that the oxidation product of this reducing agent gives rise to $PO_4^{3-}$-anions, which are needed in order to obtain the $PO_4^{3-}$-comprising compound of general formula (I).

In a preferred embodiment, the at least one reducing agent that is oxidized to at least one compound comprising at least one phosphorous atom in oxidation state +5, is carbon free. According to the present invention, carbon free means that no carbon atoms are present in the phosphorous-containing reducing agent. An advantage of a carbon free reducing agent, like $H_3PO_3$, is that the reduction can be conducted at low temperatures of at most 300° C. in a hydrothermal process, whereas for example carbon as reducing agent makes temperatures necessary of 600° C. and higher. These low temperatures according to the present invention make it possible to obtain nano-crystalline materials. Nano-crystalline materials tend to agglomeration at high temperatures which are in general necessary if for example carbon is used as the reducing agent.

In a preferred embodiment, the at least one reducing agent which is oxidized to at least one compound comprising at least one phosphorous atom in an oxidation state +5 is chosen from the group consisting of $H_3PO_3$, $(NH_4)H_2PO_3$, $(NH_4)_2HPO_3$, $H_3PO_2$, $(NH_4)H_2PO_2$, $LiH_2PO_3$, $Li_2HPO_3$, $LiH_2PO_2$ and mixtures thereof. In a particularly preferred embodiment $H_3PO_3$, $(NH_4)H_2PO_3$, $(NH_4)_2HPO_3$ are used, a very preferred reducing agent is $H_3PO_3$.

The at least one reducing agent which is oxidized to at least one compound comprising at least one phosphorous atom in oxidation state +5 is added to the mixture in step (A) in the process according to the present invention in a concentration of in general 0.04 to 2.0 mol P/L, preferably 0.1 to 1.3 mol P/L, particularly preferred 0.15 to 1.0 mol P/L, based on the whole reaction mixture in each case.

According to the present invention at least one reducing agent which is oxidized to at least one compound comprising at least one phosphorous atom in oxidation state +5 is added to the reaction mixture in step (A) of the process according to the present invention. The reducing agent that is used in the process according to the present invention will preferably be oxidized to $PO_4^{3-}$. If the at least one reducing agent which is oxidized to at least one compound comprising at least one phosphorous atom in oxidation state +5 is added to the reaction mixture in a preferably at least equimolar amount, particularly preferred in an equimolar amount, $PO_4^{3-}$ is obtained as the oxidizing product in an amount high enough to be the complete amount of phosphate-anion $PO_4^{3-}$ of the compound of general formula (I). According to this embodiment no compound having at least one phosphorous atom in oxidation state +5 has to be added.

In another preferred embodiment of the present application the mixture which is provided in step (A) additionally comprises at least one compound comprising at least one phosphorous atom in oxidation state +5. In this preferred embodiment of the present invention a combination of at least one reducing agent which is oxidized to at least one compound comprising at least one phosphorous atom in oxidation state +5 and at least one compound comprising at least one phosphorous atom in oxidation state +5 is added to the reaction mixture in step (A) of the process according to the present invention. In this embodiment of the process according to the present application, $PO_4^{3-}$ that is obtained as the oxidizing product does not need to be present in an amount high enough to be the complete amount of phosphate-anion of the compound of general formula (I), because, in this embodiment, at least one compound having at least one phosphorous atom in oxidation stage +5 is also added. This at least one compound comprising at least one phosphorous atom in oxidation state +5 will be the second source of $PO_4^{3-}$-anions, which have to be incorporated into the compound of general formula (I).

Preferred compounds comprising at least one phosphorous atom in oxidation state +5 which are optionally added in step (A) are chosen from the group consisting of $H_3PO_4$, $(NH_4)H_2PO_4$, $(NH_4)_2HPO_4$, $(NH_4)_3PO_4$, $Li_3PO_4$, $LiH_2PO_4$, $Li_2HPO_4$ and mixtures thereof. Particularly preferred are $H_3PO_4$, $(NH_4)H_2PO_4$, $(NH_4)_2HPO_4$ and mixtures thereof, very preferred is $H_3PO_4$.

The at least one compound comprising at least one phosphorous atom in oxidation state +5 is added to the mixture in step (A) in the process according to the present invention in a concentration of in general 0.04 to 2.0 mol P/L, preferably 0.1 to 1.3 mol P/L, particularly preferred 0.15 to 1.0 mol P/L, based on the whole reaction mixture in each case.

If compounds are used in the process according to the present invention that bear two functionalities in respect of the present process, like for example compounds that comprise a lithium-cation and a $PO_4^{3-}$- or $PO_3^{3-}$-anion, the amounts of the compounds, which are introduced into the reaction mixture, are adjusted in a way that all necessary components are present in the reaction mixture in amounts that are suitable for obtaining the compound according to general formula (I). A person having ordinary skill in the art does know how to calculate these amounts.

In a further preferred embodiment, in addition to the at least one reducing agent which is oxidized to at least one compound comprising at least one phosphorous atom in oxidation state +5 and optionally at least one compound comprising at least one phosphorous atom in oxidation state +5, at least one additional reducing agent is added to the mixture in step (A) of the process according to the present invention. The additional reducing agent may also be carbon-free or may contain carbon.

The at last one additional reducing agent is preferably chosen from hydrazine or derivatives thereof, hydroxyl amine or derivatives thereof, reducing sugars, like glucose, saccharose (succhrose) and/or lactose, alcohols like aliphatic alcohols having 1 to 10 carbon atoms, like methanol, ethanol, propanols, for example n-propanol or iso-propanol, butanols, for example n-butanol, iso-butanol, ascorbic acid, and compounds comprising easily oxidisable double bonds, and mixtures thereof.

Examples of derivatives of hydrazine are hydrazine-hydrate, hydrazine-sulfate, hydrazine-dihydrochlorid and others. An example of a derivative of hydroxyl amine is hydroxyl amine-hydrochloride. Particularly preferred carbon-free reducing agents which are not oxidized to at least one compound comprising at least one phosphorous atom in oxidation state +5 are hydrazine, hydrazine-hydrate, hydroxyl amine or mixtures thereof.

The at least one reducing agent, which is optionally added in step (A) of the process according to the present invention, is on the one hand by nature not able to deliver $PO_4^{3-}$-anions as oxidation products which can be incorporated into the compound of general formula (I). On the other hand the at least one reducing agent does not have the total reductive potential to reduce the Q-comprising precursor, preferably the Fe(III) precursor or the Mn precursor, in which Mn has at least partially an oxidation state higher than +2, completely into Q(II), preferably Fe(II) and or Mn(II). Therefore, if at least one of these additional reducing agents is used, it is also necessary to use these reducing agents in combination with at least one compound which is oxidized to a compound comprising at least one phosphorous atom in oxidation state and optionally at least one compound comprising at least one phosphorous atom in oxidation state +5 in order to obtain compounds of general formula (I) having the advantageous electro-chemical characteristics and microstructure according to the present invention. In these cases the amount and the concentrations of the at least one compound which is oxidized to at least one compound comprising at least one phosphorous atom in oxidation state +5, optionally at least one compound comprising at least one phosphorous atom in oxidation state +5 and optionally at least one additionally reducing agent, which are added in step (A), have to be adjusted accordingly. A person having ordinary skill in the art does know how the respective amounts have to be calculated.

The at least one additional reducing agent is optionally added to the mixture in step (A) in the process according to the present invention in a concentration which depends strongly on the reducing power and reducing potential of this agent. A person having ordinary skill in the art does know how the respective amount has to be calculated.

In general the molar ratio between the at least one reducing agent which is oxidized to at least one compound comprising at least one phosphorous atom in oxidation state +5 and at least one compound comprising at least one phosphorous atom in oxidation state +5 is 0.8 to 1.5, more preferably 0.9 to 1.1, most preferably 1.0.

In another embodiment, if a combination of at least one reducing agent which is oxidized to a compound comprising at least one phosphorous compound in oxidation stage +5, preferably $H_3PO_3$, and at least one compound comprising at least one phosphorous atom in oxidation stage +5, preferably $H_3PO_4$, is added in step (A) of the process according to the present invention, this combination is preferably added in a ratio, for example, $H_3PO_3/H_3PO_4$, which is larger than the ratio that is necessary to obtain the desired compound according to general formula (I), to overcome oxidative influences within the synthesis route, e.g. within the preparation of the mixture in the presence of oxygen and/or within the optional calcination of the dried material in the presence of oxygen impurities. A person having ordinary skill in the art does know how to calculate the stoichiometric amounts of the components in the mixture of step (A) according to the present invention.

In a preferred embodiment, the at least one lithium-comprising compound, the at least one Q-comprising compound, in which Q has at least partially an oxidation state higher than +2, preferably in which iron has the oxidation state +3 or preferably in which manganese has at least partially an oxidation state higher than +2 as mentioned above, the at least one reducing agent which is oxidized to at least one compound comprising at least one phosphorous atom in oxidation state +5, and optionally the at least one compound comprising at least one phosphorous atom in oxidation state +5, are added to the essentially aqueous mixture in amounts that are adjusted in a way that the stoichiometry according to general formula (I) is obtained. A person having ordinary skill in the art does know how to calculate the necessary amounts.

In another preferred embodiment of the present invention, the at least one lithium-comprising compound is added in an amount that is ≥1% by weight, preferably ≥2% higher than the stoichiometric amount according to general formula (I).

In one embodiment of the process according to the present invention the components which are present in the mixture that is provided in step (A) are mixed in dry state by intimately milling. A person having ordinary skill in the art does know how this intimate milling can be obtained and which apparatuses like mills can be used. The milled components are than dissolved in a suitable amount of solvent, being preferably water.

In another embodiment of step (A) of the process according to the present invention, the components are mixed by subsequent dissolving them in the solvent, preferably in water.

The mixture which is provided in step (A) of the process according to the present invention is in a preferred embodiment essentially aqueous. The wording "essentially aqueous" in this invention has the meaning that more than 50% by weight, preferably more than 65% by weight, particularly preferably more than 80% by weight of the solvent, which is used to provide the essentially aqueous mixture in step (A) of the process according to the present invention, is water.

In addition to water, further solvents that are miscible with water can be present. Examples of these solvents are aliphatic alcohols having 1 to 10 carbon atoms like methanol, ethanol, propanols, for example n-propanol or iso-propanol, butanols, for example n-butanol, iso-butanol. According to the present invention, alcohols can be added in step (A) of the process according to the present invention as additional reducing agent and/or as additional solvent.

In a very preferred embodiment, the solvent that is used in step (A) of the process according to the present invention is water without any additional solvents. In the context of the present invention the wording "without any additional solvents" means that in the very preferred embodiment that water is used as sole solvent, solvents other than water are present in the reaction mixture in an amount of less than 2% by weight, preferably less than 1% by weight, more preferably less than 0.15% by weight.

The order, in which the different components are added to the solvent or mixture of solvents in step (A), is not determined. In a preferred embodiment, the lithium-comprising compound is added first to the solvent, the Q-comprising compound, preferably the iron-comprising compound, in which iron has oxidation state +3, or the manganese-comprising compound in which manganese has at least partially an oxidation state being higher than +2, is added as the second component. Optionally the at least one compound having at least one phosphorous atom having the oxidation state +5, and the at least one reducing agent and optionally the at least one additional reducing agent, are added subsequently.

In a preferred embodiment of the present invention, the mixture obtained from step (A) of the process according to the present invention is an essentially aqueous solution of at least one lithium-comprising compound, at least one Q-comprising compound, preferably at least one iron-comprising compound, in which iron has the oxidation state +3, or at least one manganese-comprising compound, in which manganese has at least partially an oxidation state being higher than +2, at least one reducing agent which is oxidized to at least one compound comprising at least one phosphorous atom in oxidation state +5, optionally in combination with at least one compound comprising at least one phosphorous atom in oxidation state +5.

When conducted in an essentially aqueous way, step (A) can be conducted in all suitable reactors that are known to a person skilled in the art, for example an autoclave. Step (A) can be conducted continuously or discontinuously.

The temperature, under which step (A) of the process according to the present invention is conducted in an essentially aqueous way is 10 to 120° C., preferably 15 to 100° C., particularly preferably 20 to 30° C., for example room temperature. If temperatures higher than 100° C. are used, the reaction mixture has to be present in a pressure-resistant reactor, because of the boiling point of water. To increase the homogeneity of the mixture, mixing is conducted at elevated temperature and optionally under the application of shearing force, for example by the use of an ultrathurrax.

In a preferred embodiment the mixture is stirred in step (A) for a time of 0.05 to 80 hours, particularly preferred 0.1 to 20 hours, for example 0.5 to 2 hours. The pH-value of the reaction mixture that is obtained in step (A) of the process according to the present invention in general below pH 7, preferably below pH 6, for example at 2.0 to 5.0.

Step (A) of the process according to the present invention can be conducted under air or under an inert atmosphere. Examples of inert gases are nitrogen, noble gases like helium or argon. In a preferred embodiment, step (A) is conducted under air or under a nitrogen atmosphere.

Reduction of most of Q to $Q^{2+}$, preferably of $Fe^{3+}$ to $Fe^{2+}$ or of $Mn^{3+}$, $Mn^{4+}$, $Mn^{5+}$, $Mn^{6+}$ and/or $Mn^{7+}$ to $Mn^{2+}$, is in general conducted in step (B) of the process according to the present invention. It is also possible that reduction immediately starts in step (A) after addition of the reducing agent in the aqueous mixture. In this embodiment, at least part of Q is reduced to Q(II), preferably Fe(III) is reduced to Fe(II) or $Mn^{3+}$, $Mn^{4+}$, $Mn^{5+}$, $Mn^{6+}$ and/or $Mn^{7+}$ is reduced to $Mn^{2+}$ in step (A) of the process according to the present invention. It is further possible that reduction starts after the aqueous mixture is heated to an increased temperature of 40 to 100° C., preferably 60 to 95° C. In another preferred embodiment, if a combination of two P-comprising compounds is used as the reducing agent, for example $H_3PO_3/H_3PO_4$, the reduction starts, when both components are added.

Step (B):

Step (B) of the process according to the present invention comprises heating the mixture obtained in step (A) at a temperature of 100 to 500° C. and at an autogeneous pressure to reduce Q, preferably Fe or Mn, to oxidation state +2 and to obtain a compound of general formula (I).

Step (B) of the process according to the present invention is conducted in general at a temperature of 100 to 500° C., preferably at 180 to 400° C., most preferably at 220 to 320° C., for example at 250 to 300° C.

In one embodiment, step (B) of the process according to the present invention, can be conducted under hydrothermal conditions, wherein liquid water and water vapour are present in equilibrium, for example at a temperature of 100 to 374.15° C. Conducting step (B) of the process according to the present invention under hydrothermal conditions is preferred. Under hydrothermal conditions autogeneous pressures of 1 bar at 100° C. to 220 bar at 374° C. are present in the autoclave.

In another embodiment, step (B) of the process according to the present invention, is conducted under supercritical conditions, for example at a temperature of above 374.15° C. If step (B) of the process according to the present invention is conducted under supercritical conditions, the reaction mixture is present in a supercritical phase. In this embodiment, a pressure of 500 bar and more can be obtained, depending on the filling degree of the autoclave.

Step (B) of the process according to the present invention is conducted in general at a pressure of 1 to 200 bar, preferably at 2 to 150 bar, most preferably at 50 bis 100 bar. The pressure which is present in step (B) of the process according to the present invention can in one embodiment be set by the components of the reaction mixture, which is heated to the mentioned temperatures. For example, if water is the solvent of the reaction mixture prepared in step (A) and treated hydrothermally in step (B) of the process according to the present invention, it will evaporate at a temperature above 100° C. If step (B) is conducted in a sealed reactor, for example an autoclave, the pressure will rise in this reactor caused by the evaporating solvent. In a very preferred embodiment, step (B) of the process according to the present invention is conducted in an autoclave.

In a second embodiment of the process according to the present invention, the pressure of the reaction mixture in step (B) can be adjusted by the addition of at least one suitable gas to the reactor. This gas is preferably an inert gas, most preferably chosen from noble gases like argon, helium or mixtures, or nitrogen. In a preferred embodiment of the process according to the present invention, nitrogen is used as inert gas.

In a further embodiment of the process according to the present invention, the reaction mixture obtained from step (A) is placed in a suitable reactor, for example an auto-clave, followed by adjusting the pressure in the reactor to a pressure above atmospheric pressure, being for example 1.5 to 20 bar, most preferably 5 to 15 bar, for example 10 bar. Subsequently, the reaction mixture is heated to a temperature which is desired, preferably as mentioned above, wherein the pressure rises at the same to the values as mentioned above.

Step (B) of the process according to the present invention can be conducted in any reactor, which is suitable for the temperature and pressure of step (B). In a preferred embodiment, step (B) of the process according to the present invention is conducted in an autoclave. In a more preferred embodiment, step (B) of the process according to the present invention is conducted in the same reactor as step (A) of the process.

Step (B) of the process of the present invention can be conducted continuously or discontinuously.

Heating according to step (B) of the process according to the present invention is conducted as long as it is necessary to obtain a compound according to formula (I). In a preferred embodiment, step (B) of the process according to the present invention is conducted for 0.5 to 30 hours, preferably 4 to 20 hours, most preferably 8 to 16 hours, for example 12 hours.

In general, the reaction mixture is stirred in step (B) of the process according to the present in invention. In a preferred embodiment, the mixture is stirred in step (B) very rapidly, in order to obtain compounds of general formula (I), which are very homogeneous. The stirrer speed in step (B) is preferably 400 to 1200 rpm (rounds per minute), more preferably 600 to 100 rpm, for example 700 rpm. The stirrer speed in step (B) has a significant effect on the quality of the products obtained from the process according to the present invention. Suitable stirrers are known to a person having ordinary skill in the art, for example blade stirrer.

After step (B) of the process according to the present invention the product, at least one compound according to general formula (I), most preferably $LiFePO_4$ or $LiMnPO_4$, is obtained in the solvent, which has been applied in step (A) of the process. In a preferred embodiment of the process according to the present invention, water is used as the solvent. In the case that other compounds according to general formula (I) not being $LiFePO_4$, for example $LiMnPO_4$, are prepared by the process according to the present invention, either solutions or emulsions are obtained in step (B) depending on the solubility of these compounds in the solvent. In the preferred case that $LiFePO_4$ or $LiMnPO_4$ is obtained in the process according to the present invention, an aqueous suspension of $LiFePO_4$ or $LiMnPO_4$ is obtained in step (B).

If an emulsion is obtained after step (B) of the process according to the present invention, which is preferred, this emulsion has a pH-value of in general 3 to 7, preferably 4.5 to 6.5, for example 5.5.

The present invention also relates to a compound according to general formula (I) as defined above, preparable by a process according to the present invention.

In a preferred embodiment of the process according to the present invention, the reaction mixture, which is obtained from step (B) is subjected to step (C), which is an optional separating step, in order to separate the compound according to general formula (I) from the reaction medium.

Step C:

In a preferred embodiment of the process according to the present invention, after step (B), the following step (C) is conducted:

(C) separating the compound of general formula (I) from the mixture obtained in step (B).

In general, all methods that are known to a person having ordinary skill in the art for separating solid materials from solution or emulsion can be used in step (C) of the process according to the present invention. Preferred methods are filtration, centrifugation, drying. In a preferred embodiment of step (C), the at least one compound of general formula (I) which is obtained in step (B) in, preferably aqueous, emulsion is separated in step (C) by filtration, preferably supported by application of increased or reduced pressure. A person having ordinary skill in the art does know how to conduct this.

In a further preferred embodiment of the process according to the present invention, after separation of the at least one compound of general formula (I) in solid form, this solid is washed, in order to obtain the at least one compound in essentially pure form. In respect of the process according to the present invention. "Essentially pure" means that less than 5% by weight, preferably less than 2% by weight, more preferably less than 1% by weight compounds are present after washing that are not compounds of general formula (I).

In a preferred embodiment, washing is conducted with a suitable solvent, in which the at least one compound of general formula (I) is essentially insoluble. "Essentially insoluble" means that less than 5% by weight, preferably less than 2% by weight, more preferably less than 1% by weight of the at least one compound of general formula (I) is dissolved during the washing procedure.

In respect of the process according to the present invention, "essentially" means more than 90%, preferably more than 95%, more preferably more than 98%.

In a very preferred embodiment, washing in step (C) of the process according to the present invention is conducted with water. In a more preferred embodiment of the present invention, washing is conducted with several portions of water, instead of one complete portion of water. In general, washing is conducted as many times as necessary, in order to obtain the compound according to general formula (I) in essentially pure form. A method to determine the amount of water that is necessary to obtain an essentially pure compound is, for example, the conductivity of the compound, wherein an essentially pure compound shows a very low conductivity.

In a further preferred embodiment, the at least one compound that is obtained after step (C) of the process according to the present invention, is dried, in order to remove the solvent, preferably water. Drying can be conducted by any method known to a person having ordinary skill in the art, for example heating to a temperature of 40 to 150° C. In a further embodiment of the process according to the present invention, drying can be conducted under reduced pressure, for example at 400 to 900 mbar. Drying by heating can be conducted in any apparatus suitable for drying and known to the skilled artisan, for example in a hot-air cabinet or in any kind of furnaces.

Drying in step (C) of the present invention is conducted as long as essentially the whole amount of solvent, preferably water, is removed. A person having ordinary skill in the art does know, when essentially all solvent is removed, for example all solvent is removed if the compound of general formula (I) reaches a constant weight.

The solids that are obtained from step (C) of the process according to the present invention supply improved Li-ion diffusivity in the charging and discharging of a Li-ion battery containing them. By improving the Li-ion diffusivity the power characteristics and additionally the capacity of a Li-ion battery can be increased.

Therefore the present invention also relates to particles or agglomerates comprising at least one compound of general formula (I) obtainable/preparable by the process according to the present invention.

Because of this fact the particles or agglomerates comprising at least one compound according to general formula (I) preparable by the process according to the present invention, preferably $LiFePO_4$ or $LiMnPO_4$, are particularly suitable for the use for the preparation of a cathode of a lithium-ion battery or an electrochemical cell. Therefore the present invention also relates to the use of compounds of general formula (I) obtainable/preparable by the process according to the present invention for the preparation of a cathode of a lithium-ion battery or an electrochemical cell.

In addition, the present invention relates to a cathode for a lithium-ion battery, comprising at least one particle or agglomerates preparable to the process according to the present invention or at least one compound according to general formula (I), preferably $LiFePO_4$ or $LiMnPO_4$, preparable by the process according to the present invention.

Step (D):

In one embodiment of the process according to the present invention, the solid compound obtained from step (C) is optionally calcinated at a calcination temperature of 300 to 1000° C. in an optional step (D) of the process according to the present invention.

Optional step (D) is preferably conducted at a calcination temperature of 375 to 1100° C., particularly preferably at a calcination temperature of 400 to 950° C., for example 450 to 850° C.

Calcination is in general conducted under an inert gas atmosphere. Examples of inert gases are nitrogen, technical nitrogen comprising traces of oxygen or noble gases like helium and/or argon. In a preferred embodiment, nitrogen is used in optional step (D) of the process according to the present invention. If technical nitrogen is used in optional step (D) of the present invention, this nitrogen can comprise traces of oxygen.

One advantage of the process according to the present invention is that calcination can be conducted under an inert atmosphere and no need exists to conduct optional step (D) under a reducing atmosphere according to the prior art. Based thereon the process according to the present invention can be conducted in a more time and cost saving way. The absence of a gaseous reducing agent, for example hydrogen, avoids the presence of explosive gaseous mixtures. If the nitrogen used in the calcination step comprises higher amounts of oxygen, it is possible to add reducing gases like CO or hydrogen to the oxygen comprising nitrogen.

Optional step (D) of the process according to the present invention is conducted for a time of 0.1 to 8 hours, preferably 0.5 to 3 hours. In a preferred embodiment of optional step (D), the calcination temperature is hold for a period of 0.1 to 2 hours, very preferably 0.5 to 1.5 hours, and at the end the temperature is decreased to room temperature.

The temperature of calcination has a significant impact onto the specific surface of the compound according to general formula (I). Low temperatures during calcination give normally rise to high specific surface area. High temperatures during calcination give usually rise to low specific surface area.

The particles or agglomerates that are obtained in step (D) of the process according to the present invention can optionally comprise further elements, for example carbon, that are optionally obtained by pyrrolysis of the additional reducing agent, for example, a sugar.

The process according to the present invention can be conducted continuously or discontinuously. In a preferred embodiment the process according to the present invention is conducted continuously. Suitable apparatuses for optional step (D) are known to the person having ordinary skill in the art. One example for a discontinuous or continuous calcination is a rotary furnace. In case of continuous calcination the residence time in a rotary furnace is based on the inclination and the rotating speed of the furnace. A person having ordinary skill in the art does know how a suitable residence time is adjusted in the rotary furnace. In a preferred embodiment the solid that is calcinated in step (D) of the process according to the present invention is moved during calcination, for example in a fluidized bed reactor or in a rotary furnace. The solid can also be stirred during calcination. The rotary furnace can comprise different temperature zones. For example, in a first zone the temperature is adjusted to a low temperature in order to drain the spray dried powder, whereas in another zone a higher calcination temperature is present. The speed of heating of the powder is depending on the temperatures in the different zones and on the speed with which the powder is moved in the furnace.

Optional step (D) of the process according to the present invention is in general conducted under a pressure that is suitable that preferably complete conversion into the desired products is obtained. In a preferred embodiment optional step (D) is conducted under a pressure which is slightly higher than atmospheric pressure, in order to prevent oxygen penetrating the reactor from the outside. This slightly increased atmospheric pressure is preferably caused by at least one inert gas that is streaming over the solid compound that is calcinated in this step.

Depending on the composition of the electrode which can be prepared form the compound of general formula (I) and on the desired electrochemical properties of the resulting lithium-ion battery, it can be advantageous, according to the present application, if the solid compound obtained from step (C) is mechanically treated prior to optional step (D) and/or if the solid compound obtained from step (D) is mechanically treated after step (D), in order to destroy the agglomerates into smaller and more dense agglomerates having the required size or into the primary particles. Suitable mills, compactors and/or rolls are known to a person having ordinary skill in the art. Examples are jet mills which supply very low abrasion, preferably under the use of nitrogen and/or air. For milling of the calcinated product also wet milling processes may be advantageous, for example by the use of a bead mill. Further suitable apparatuses are compactors and/or rollings.

The materials according to the present invention of general formula (I) preparable by the process according to the present invention are particularly suitable for the use for the preparation of a cathode of a lithium-ion battery or an electrochemical cell. Therefore the present invention also relates to the use of a particle or agglomerate or of compound of general formula (I) obtainable/preparable by the process according to the present invention for the preparation of a cathode of a lithium-ion battery or an electro-chemical cell.

The present invention further relates to a cathode for a lithium-ion battery, comprising at least one particle or agglomerate compound according to general formula (I), preferably $LiFePO_4$ or $LiMnPO_4$, obtainable/preparable by the process according to the present invention. To obtain a cathode as mentioned above the compound according to general formula (I) is mixed with at least one electrically conducting material, described for example in WO 2004/082047.

Suitable electrically conducting materials are for example carbon black, graphite, carbon fibres, carbon nanofibres, carbon nanotubes or electrically conducting polymers. Typically 2.0 to 40% by weight of the at least one electrically conducting material are used together with the compound according to general formula (I) in the cathode. To obtain the cathode the electrically conducting material and the compound according to general formula (I) are mixed, optionally in the presence of an organic solvent and optionally in the presence of an organic binder, for example PVDF, and this mixture is optionally formed and dried. A temperature of 80 to 150° C. is applied in the drying step.

In a preferred embodiment at least a part of the at least one electrically conducting material or at least one precursor of an electrically conducting material is added during the preparation of compounds according to general formula (I) as mentioned above. In a preferred embodiment, at least a part of the at least one electrically conducting material or at least one precursor of an electrically conducting material is added to the mixture of the starting materials in the preparation of the compound according to general formula (I). The remaining part of the least one electrically conducting material or at least one precursor of an electrically conducting material, which has not been added during the preparation of compounds according to general formula (I), is added after this preparation.

Therefore, the present invention also relates to a process for the preparation of a mixture comprising at least one compound according to general formula (I) as defined above and at least one electrically conducting material comprising the following steps (E) providing a mixture comprising at least one electrically conducting material or at least one precursor of an electrically conducting material, at least one lithium-comprising compound, at least one Q-comprising compound, in which Q has an oxidation state higher than +2, preferably Fe in oxidation state +3 or Mn at least partially in an oxidation state higher than +2, and at least one $M^1$-comprising compound, if present, and/or at least one $M^2$-comprising compound, if present, and/or at least one $M^3$-comprising compound, if present, and at least one reducing agent which is oxidized to at least one compound comprising at least one phosphorous atom in oxidation state +5, and (F) heating the mixture obtained in step (E) at a temperature of 100 to 500° C. and an autogeneous pressure to reduce Q to oxidation state +2 and to obtain a mixture comprising at least one compound according to general formula (I) and at least one electrically conducting material.

In a preferred embodiment of this process according to the present invention, the mixture that is provided in step (E) is essentially aqueous. In a further preferred embodiment the mixture which is provided in step (E) additionally comprises at least one compound comprising at least one phosphorous atom in oxidation state +5.

The lithium-, $M^1$, $M^2$ and/or $M^3$-comprising compounds, the Q-comprising compounds, the at least one reducing agent which is oxidized to at least one compound comprising at least one phosphorous atom in oxidation state +5, the optionally present at least one compound comprising at least one phosphorous atom in oxidation state +5, the electrically conductive materials, the apparatuses and the process parameters of the steps (E) and (F) correspond to the ones described above. In addition to the at least one reducing agent which is oxidized to at least one compound comprising at least one phosphorous atom in oxidation state +5, the optionally present at least one compound comprising at least one phosphorous atom in oxidation state +5, at least one additional reducing agent can be added in a preferred embodiment, as mentioned and defined above.

In a further preferred embodiment, the at least one reducing agent which is oxidized to at least one compound comprising at least one phosphorous atom in oxidation state +5 is chosen from the group consisting of $H_3PO_3$, $(NH_4)H_2PO_3$, $(NH_4)_2HPO_3$, $H_3PO_2$, $(NH_4)H_2PO_2$, $LiH_2PO_3$, $Li_2HPO_3$, $LiH_2PO_2$ and mixtures thereof.

In the process for the preparation of a mixture comprising at least one compound according to general formula (I) as defined above and at least one electrically conducting material, the electrically conducting material is chosen from the group consisting of carbon black, graphite, carbon fibres, carbon nanofibres, carbon nanotubes, electrically conducting polymers and mixtures thereof. The at least one electrically conducting material is in general added in step (E) of the process according to the present invention in an amount of 0.01 to 15% by weight, preferably 0.1 to 10% by weight, more preferably 0.2 to 8% by weight, based on the whole reaction mixture present in step (E) of the process according to the present invention.

If carbon black, graphite or substances essentially consisting of carbon are used as electrically conducting materials in step (E), these materials are preferably suspended in a mixture, preferably an essentially aqueous solution or dispersion, of the other components. This can be achieved by direct addition of these electrically conducting materials to the, preferably aqueous, mixture of the other components. Alternatively, carbon black, graphite or substances essentially consisting of carbon can be suspended in an aqueous solution of hydrogen peroxide, and this suspension can then be added to a solution or dispersion of one or more components as mentioned above. Treatment with hydrogen peroxide normally improves the wettability of carbon with water and makes it possible to obtain carbon containing suspensions having an improved stability, i.e. having a lower tendency for demixing. In addition the homogenous dispersion of the electrically conducting material in the mixture is improved. By further stirring and/or heating of the aqueous suspension the excess hydrogen peroxide is decomposed into water and oxygen in the catalytic presence of the Li-, Q- and/or P-containing precursors.

In another embodiment, at least one surfactant can be added in step (E) of the process according to the present invention. Suitable surfactants are for example non-ionic surfactants, preferably ethylene oxide/propylene oxide block copolymers.

If at least one reducing agent which is oxidized to at least one compound comprising at least one phosphorous atom in oxidation state +5, and at least one compound comprising at least one phosphorous atom in oxidation state +5 are added in step (E) of the process according to the present invention, the ratio between at least one reducing agent which is oxidized to at least one compound comprising at least one phosphorous atom in oxidation state +5, and at least one compound comprising at least one phosphorous atom in oxidation state +5 is for example 0.8 to 5.0, preferably 0.9 to 4.0, more preferably 1.0.

Step (G):

In a preferred embodiment of the process according to the present invention, after step (F), the following step (G) is conducted:

(G) separating the mixture comprising at least one compound according to general formula (I) as defined above and at least one electrically conducting material from the mixture obtained in step (F).

In general, all methods that are known to a person having ordinary skill in the art for separating solid materials from solution or emulsion can be used in step (G) of the process according to the present invention.

In principle, optional step (G) of the process according to the present invention can be conducted according to step (C) as described above. Therefore, the details and preferred embodiments which have been explained in respect of step (C) are also details and preferred embodiments of step (G) with the difference that in step (G) a mixture comprising at least one compound according to general formula (I) as defined above and at least one electrically conducting material is treated, whereas in step (C) at least one compound according to general formula (I) as defined above is treated.

Step (H):

In one embodiment of the process according to the present invention, the solid compound obtained from step (G) is calcinated at a calcination temperature of 300 to 1000° C. in an optional step (H) of the process according to the present invention.

In principle, optional step (H) of the process according to the present invention can be conducted according to step (D) as described above. Therefore, the details and preferred embodiments which have been explained in respect of step (D) are also details and preferred embodiments of step (H) with the difference that in step (H) a mixture comprising at least one compound according to general formula (I) as defined above and at least one electrically conducting material is treated, whereas in step (D) at least one compound according to general formula (I) as defined above is treated.

The present invention also relates to a mixture, comprising at least one compound according to general formula (I) as defined above and at least one electrically conducting material, preparable by a process comprising steps (E), (F), and optionally (G) and/or (H) as mentioned above. In contrast to materials according to the prior art, these mixtures according to the present invention show an improved dispersion of the at least one electrically conducting material within the agglomerates of the resulting material. This improved C-dispersion leads to a highly electrically conductive percolation network of carbon within the cathode material powder according to the present invention and in addition to an improved electrical conductivity of the layer like electrode. The mixture comprising at least one compound according to general formula (I) and at least one electrically conducting material in general has BET surface area which is determined by the kind and the amount of the additional carbon within the mixture and may vary from 0.1 to 500 m²/g.

Therefore, the present invention also relates to the use of a mixture as mentioned above or agglomerates comprising the mixture, comprising at least one compound according to general formula (I) as defined above and at least one electrically conducting material for the preparation of a cathode of a lithium-ion battery or an electrochemical cell.

The present invention also relates to a cathode for a lithium-ion battery, comprising a mixture or agglomerates comprising the mixture as mentioned above.

For the preparation of a cathode using the compound according to general formula (I) as mentioned above or a mixture comprising the compound according to general formula (I) or agglomerates as mentioned above and at least one electrically conducting material as mentioned above, in a preferred embodiment the following binders are used:

Polyethyleneoxide (PEO), cellulose, polyethylene, polypropylene, polytetrafluoroethylene, polyacrylonitrile-methylmethacrylate, styrene-butadiene-copolymers, tetrafluoroethylene-hexfluoropropylene-copolymers, polyvinylidenefluoride-hexafluoropropylene-copolymers (PVdF-HFP), perfluoroalkyl-vinylether-copolymers, vinylidenefluoride-chlorotrifluoroethylene-copolymers, ethylene-chlorofluoroethylene-copolymers, ethylene-acrylic acid-copolymers (with and without sodium ions included), ethylene-methacrylic acid (with and without sodium ions included), polyimides and polyisobutene.

The binder is normally added in an amount of 1 to 10% by weight, preferably 2 to 8% by weight, particularly preferred 3 to 7% by weight, in each case based on the whole cathode material.

The process according to the present invention is further illustrated by the following example:

EXAMPLE 1

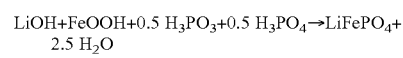

14.66 g (98%, 0.6 mol, Merck) LiOH are dissolved under stirring in 1000 mL of water. 34.5 g (85%, 0.3 mol, Bernd Kraft GmbH Duisburg, Germany) $H_3PO_4$ are added to this solution. A white precipitate occurs having a pH of 6.5. Subsequently 64.1 g Bayoxid EF300 (FeOOH, Fe-content 51.3%, 0.6 mol, BET 290 m$^2$/g) are added. Afterwards a solution of 25.05 g $H_3PO_3$ (98%, 0.3 mol, Acros) in 320 mL is added, a pH of 2.84 is obtained.

The reaction is conducted in a 3.5 l autoclave. The pressure in the autoclave is set to 10 bar with nitrogen. The stirrer is switched on with 700 rpm. The reaction mixture is stirred at room temperature for one hour and is then heated to 270° C. The temperature is held at 270° C. for 12 hours and is then lowered to room temperature.

The suspension obtained has a pH of 5.52 and a conductivity of 2.09 mS.

The reaction mixture is filtrated and the solid obtained is washed with 1000 mL demineralized water in 5 portions. Conductivity is 26.4 µS. The solid is dried at 80° C. overnight in a drying furnace until has reached a constant weight.

EXAMPLE 2

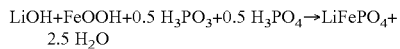
LiOH+FeOOH+0.5 $H_3PO_3$+0.5 $H_3PO_4$→LiFePO$_4$+ 2.5 $H_2O$ 14.66 g (98%, 0.6 mol, Merck) LiOH are dissolved under stirring in 1000 mL of water. 34.5 g (85%, 0.3 mol, Bernd Kraft GmbH Duisburg, Germany) $H_3PO_4$ are added to this solution. A white precipitate occurs having a pH of 6.5. Subsequently 64.1 g Bayoxid EF300 (FeOOH, Fe-content 51.3%, 0.6 mol, BET 290 m$^2$/g) are added. Afterwards a solution of 25.05 g $H_3PO_3$ (98%, 0.3 mol, Acros) in 320 mL is added, a suspension A with a pH value of 2.84 is obtained.

3 g carbon black (Timcal Super P Li, Timcal Deutschland GmbH, D-40212 Dusseldorf, Germany) are added to the water, wherein the carbon black swims on the surface. Subsequently, 150 ml aqueous $H_2O_2$-solution (30%, Merck GmbH, D-64293 Darmstadt, Germany) are added drop wise under stirring, wherein the carbon black disperses in water. The black, aqueous carbon black dispersion B obtained is added under stirring to the suspension A.

The reaction is conducted in a 3.5 l autoclave. The pressure in the autoclave is set to 10 bar with nitrogen. The stirrer is switched on with 700 rpm. The reaction mixture is stirred at room temperature for one hour and is then heated to 270° C. The temperature is held at 270° C. for 12 hours and is then lowered to room temperature.

The suspension obtained has a pH of 5.48 and a conductivity of 2.4 mS.

The reaction mixture is filtrated and the solid obtained is washed with 1000 mL demineralized water in 5 portions. Conductivity is 29 µS. The solid is dried at 80° C. overnight in a drying furnace until has reached a constant weight.

EXAMPLE 3

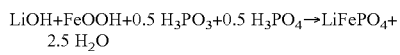
LiOH+FeOOH+0.5 $H_3PO_3$+0.5 $H_3PO_4$→LiFePO$_4$+ 2.5 $H_2O$ 14.66 g (98%, 0.6 mol, Merck) LiOH are dissolved under stirring in 1000 mL of water. 34.5 g (85%, 0.3 mol, Bernd Kraft GmbH Duisburg, Germany) $H_3PO_4$ are added to this solution. A white precipitate occurs having a pH of 6.5. Subsequently 64.1 g Bayoxid EF300 (FeOOH, Fe-content 51.3%, 0.6 mol, BET 290 m$^2$/g) are added. Afterwards a solution of 25.05 g $H_3PO_3$ (98%, 0.3 mol, Acros) in 320 mL is added, a suspension A with a pH value of 2.84 is obtained.

3 g carbon black (Timcal Super P Li, Timcal Deutschland GmbH, D-40212 Dusseldorf, Germany) are added to the water, wherein the carbon black swims on the surface. Subsequently, 0.3 g Pluronic 10400 (BASF SE, 67056 Ludwigshafen, Germany) are added under stirring, wherein the carbon black disperses in water. The black, aqueous carbon black dispersion B obtained is added under stirring to the suspension A.

The reaction is conducted in a 3.5 l autoclave. The pressure in the autoclave is set to 10 bar with nitrogen. The stirrer is switched on with 700 rpm. The reaction mixture is stirred at room temperature for one hour and is then heated to 270° C. The temperature is held at 270° C. for 12 hours and is then lowered to room temperature.

The suspension obtained has a pH of 5.9 and a conductivity of 3.9 mS.

The reaction mixture is filtrated and the solid obtained is washed with 1000 mL demineralized water in 5 portions. Conductivity is 29 µS. The solid is dried at 80° C. overnight in a drying furnace until has reached a constant weight.

EXAMPLE 4

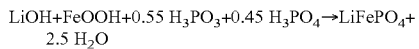
LiOH+FeOOH+0.55 $H_3PO_3$+0.45 $H_3PO_4$→LiFePO$_4$+ 2.5 $H_2O$ 14.66 g (98%, 0.6 mol, Merck) LiOH are dissolved under stirring in 1000 mL of water. 32.75 g (85%, 0.285 mol, Bernd Kraft GmbH Duisburg, Germany) $H_3PO_4$ are added to this solution. A white precipitate occurs having a pH of 6.5. Subsequently 64.1 g Bayoxid EF300 (Fe-content 51.3%, 0.6 mol, BET 290 m$^2$/g) are added. Afterwards a solution of 26.30 g $H_3PO_3$ (98%, 0.315 mol, Acros) in 320 mL is added, a pH of 2.68 is obtained.

The reaction is conducted in a 3.5 l autoclave. The pressure in the autoclave is set to 10 bar with nitrogen. The stirrer is switched on with 700 rpm. The reaction mixture is stirred at room temperature for one hour and is then heated to 270° C. The temperature is held at 270° C. for 12 hours and is then lowered to room temperature.

The suspension obtained has a pH of 5.4 and a conductivity of 2.3 mS.

The reaction mixture is filtrated and the solid obtained is washed with 1000 mL demineralized water in 5 portions. Conductivity is 30 µS. The solid is dried at 80° C. overnight in a drying furnace until has reached a constant weight.

EXAMPLE 5

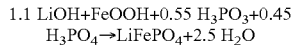
1.1 LiOH+FeOOH+0.55 $H_3PO_3$+0.45 $H_3PO_4$→LiFePO$_4$+2.5 $H_2O$ 16.13 g (98%, 0.6 mol, Merck) LiOH are dissolved under stirring in 1000 mL of water. 32.75 g (85%, 0.285 mol, Bernd Kraft GmbH Duisburg, Germany) $H_3PO_4$ are added to this solution. A white precipitate occurs having a pH of 6.5. Subsequently 64.1 g Bayoxid EF300 (Fe-content 51.3%, 0.6 mol, BET 290 m$^2$/g) are added. Afterwards a solution of 26.30 g $H_3PO_3$ (98%, 0.315 mol, Acros) in 320 mL is added, a pH of 2.8 is obtained.

The reaction is conducted in a 3.5 l autoclave. The pressure in the autoclave is set to 10 bar with nitrogen. The stirrer is switched on with 700 rpm. The reaction mixture is stirred at room temperature for one hour and is then heated to 270° C. The temperature is held at 270° C. for 12 hours and is then lowered to room temperature.

The suspension obtained has a pH of 5.7 and a conductivity of 1.2 mS.

The reaction mixture is filtrated and the solid obtained is washed with 1000 mL demineralized water in 5 portions. Conductivity is 30 µS. The solid is dried at 80° C. overnight in a drying furnace until has reached a constant weight.

EXAMPLE 6

3 LiOH+Mn$_3$O$_4$+H$_3$PO$_3$+2 H$_3$PO$_4$-->3 LiMnPO$_4$ 7.69 g lithiumhydroxide (98%, 0.315 mole, 5% excess, Merck) are dissolved in 1000 ml water in a beaker with stirring, and the solution is transferred to an autoclave. 23.6 g phosphoric acid (85%, 0.2 mole) are added. Subsequently, 23.21 g Mn$_3$O$_4$ (Mn-content 71%, 0.1 mole, BASF) are added. Afterwards, a solution of 10.25 g phosphonic acid H$_3$PO$_3$ (98% ig, 0.1 mole, Acros) in 320 ml water is added.

After addition of phosphonic acid, the autoklav is set to a pressure of 10 bar with nitrogen. The stirrer is switched on to a stirring speed of 700 rpm (rounds per minute). The reaction mixture is stirred for one hour at room temperature, and is then heated to 270° C. This temperature is held at 270° C. for 12 hours, and is then cooled to room temperature. The pressure in the autoclave is set to atmospheric pressure.

The reaction mixture is filtrated and the solid obtained is dried at 80° C. in a drying chamber. Single phase LiMnPO$_4$ is obtained, oxidation state of Mn is +2.0.

EXAMPLE 7

LiOH+MnO$_2$+H$_3$PO$_3$-->LiMnPO$_4$ 10.26 g lithiumhydroxide (98%, 0.42 mole, 5% excess, Merck) are dissolved in 1000 ml water in a beaker with stirring, and the solution is transferred to an autoclave. 37.25 g manganesedioxide (Mn-content 59%, 0.4 mole, Tronox) are added. Afterwards, a solution of 33.46 g phosphonic acid H$_3$PO$_3$ (98% ig, 0.4 mole, Acros) in 320 ml water is added.

After addition of phosphonic acid, the autoklav is set to a pressure of 10 bar with nitrogen. The stirrer is switched on to a stirring speed of 700 rpm (rounds per minute). The reaction mixture is stirred for one hour at room temperature, and is then heated to 270° C. This temperature is held at 270° C. for 12 hours, and is then cooled to room temperature. The pressure in the autoclave is set to atmospheric pressure.

The reaction mixture is filtrated and the solid obtained is dried at 80° C. in a drying chamber. Single phase LiMnPO$_4$ is obtained, oxidation state of Mn is +2.0.

The invention claimed is:

1. A process for preparing a compound of general formula (I)

$$Li_{a-b}M^1_bQ_{1-c}M^2_cP_{d-e}M^3_eO_x \quad (I),$$

wherein Q has the oxidation state +2 and M$^1$, M$^2$, M$^3$, a, b, c, d, e and x are:
Q: Fe, Mn, Co, Ni,
M$^1$: Na, K, Rb and/or Cs,
M$^2$: Mg, Al, Ca, Ti, Co, Ni, Cr, V, Fe, Mn, wherein Q and M$^2$ are different from each other,
M$^3$: Si, S, F
a: 0.8-1.9,
b: 0-0.3,
c: 0-0.9,
d: 0.8-1.9,
e: 0-0.5,
x: 1.0-8, depending on the amount and oxidation state of Li, M$^1$, M$^2$, P, M$^3$, wherein compounds of general formula (I) are neutrally charged,
comprising
(A) providing an essentially aqueous mixture comprising at least one lithium-comprising compound, at least one Q-comprising compound, in which Q has at least partially an oxidation state higher than +2, and at least one M$^1$-comprising compound, if present, and/or at least one M$^2$-comprising compound, if present, and/or at least one M$^3$-comprising compound, if present, and at least one carbon-free reducing agent which is oxidized to a compound comprising at least one phosphorous atom in oxidation state +5, and
(B) heating the mixture obtained in (A) at a temperature of 100 to 500° C. and at an autogeneous pressure to reduce Q to oxidation state +2.

2. The process according to claim 1, wherein the mixture in (A) further comprises at least one compound comprising at least one phosphorous atom in oxidation state +5.

3. The process according to claim 2, wherein the at least one compound comprising at least one phosphorous atom in oxidation state +5 is selected from the group consisting of H$_3$PO$_4$, (NH$_4$)H$_2$PO$_4$, (NR$_4$)$_2$HPO$_4$, (NH$_4$)$_3$PO$_4$, Li$_3$PO$_4$, LiH$_2$PO$_4$, Li$_2$HPO$_4$, and mixtures thereof.

4. The process according to claim 2, wherein the heating in (B) is conducted at a temperature of 180 to 350° C.

5. The process according to claim 1, wherein the at least one carbon-free reducing agent is selected from the group consisting of H$_3$PO$_3$, (NH$_4$)$_2$HPO$_3$, (NH$_4$)$_2$HPO$_3$, H$_3$PO$_2$, (NH$_4$)H$_2$PO$_2$, LiH$_2$PO$_3$, Li$_2$HPO$_3$, Li$_2$PO$_2$ and mixtures thereof.

6. The process according to claim 1, further comprising:
(C) separating the compound of general formula (I) from the mixture obtained in (B).

7. The process according to claim 1, wherein (B) is conducted in an autoclave.

8. A process for preparing a mixture comprising at least one compound of general formula (I) of claim 1 and at least one electrically conducting material, comprising:
(E) providing an essentially aqueous mixture comprising at least one electrically conducting material or at least one precursor of an electrically conducting material, at least one lithium-comprising compound, at least one Q-comprising compound, in which Q has at least partially an oxidation state higher than +2, and at least one M$^1$-comprising compound, if present, and/or at least one M$^2$-comprising compound, if present, and/or at least one M$^3$-comprising compound, if present, and at least one carbon-free reducing agent which is oxidized to a compound comprising at least one phosphorous atom in oxidation state +5; and
(F) heating the mixture obtained in (E) at a temperature of 100 to 500° C. and at an autogeneous pressure to reduce Q to oxidation state +2.

9. The process according to claim 8, wherein the mixture in (E) further comprises at least one compound comprising at least one phosphorous atom in oxidation state +5.

10. The process according to claim 8, wherein the at least one carbon-free reducing agent is selected from the group consisting of H$_3$PO$_3$, (NH$_4$)H$_2$PO$_3$, (NH$_4$)$_2$HPO$_3$, H$_3$PO$_2$, (NH$_4$)H$_2$PO$_2$, LiH$_2$PO$_3$, Li$_2$HPO$_3$, LiH$_2$PO$_2$ and mixtures thereof.

11. The process according to claim 8, wherein the electrically conducting material is selected from the group consisting of carbon black, graphite, carbon fibres, carbon nanofibres, carbon nanotubes, electrically conducting polymers, and mixtures thereof.

* * * * *